United States Patent [19]

Tanaka

[11] Patent Number: 4,913,915

[45] Date of Patent: Apr. 3, 1990

[54] SOLID FOOD STUFF COMPOSITION CONTAINING DUNALIELLA ALGAE AND PROCESS FOR THE PRODUCTION THEREOF

[76] Inventor: Yoshio Tanaka, 22 Banchi, Yamaguchi-cho, Gifu-shi, Gifu-ken, Japan

[21] Appl. No.: 225,420

[22] Filed: Jul. 28, 1988

[30] Foreign Application Priority Data

Feb. 25, 1988 [JP] Japan .................................. 63-40756

[51] Int. Cl.$^4$ ............................................... A23L 1/42
[52] U.S. Cl. ....................................... 426/72; 426/103; 426/250; 426/285; 426/302; 426/454
[58] Field of Search .................... 426/72, 89, 103, 285, 426/302, 648, 454, 250

[56] References Cited

U.S. PATENT DOCUMENTS 3,798,054  3/1974  Kawata et al. .................. 117/100 A
4,143,162  3/1979  Tanaka .................................. 426/89

FOREIGN PATENT DOCUMENTS 56-113269  9/1981  Japan .
61-67471   4/1986  Japan .

OTHER PUBLICATIONS

Finney, K. F. et al., "Use of Algae Dunaliella as a Protein Supplement in Bread", Cereal Chem. 61(5), pp. 402–406.
Ben-Amotz et al., "Glycerol, B-Carotene Metabolism in the Halotolerant Alga Dunaliella: A Model System For Biosolar Energy Conversion", *TIBS*, pp. 297–299, (Nov. 1981).
Ben-Amotz et al., "Glycerol, B-Carotene and Dry Algal Meal Production By Commercial Cultivation of Dunaliella", *Algae Biomass*, pp. 604–609, (1980).
Ben-Amotz et al., "Accumulation of B-Carotene in Halotolerant Algae Purification and Characterization of B-Carotene-Rich Globules form Dunaliella Bardawil (Chloriphyceae)", *Zinc Adsorption and Transport*, pp. 529–535, (Jun. 1982).
Fried et al., "Lipid Composition of the Halotolerant Alga, Dunaliella Bardawil", *Biochimica et Biophysica Acta*, vol. 713, pp. 419–426, (1982).

*Primary Examiner*—Marianne Cintins
*Assistant Examiner*—Evan Federman
*Attorney, Agent, or Firm*—Browdy and Neimark

[57] ABSTRACT

Dunaliella algae, which is very rich in $\beta$-carotene, can be utilized as an excellent nourishing diet supplement without extracting the $\beta$-carotene from the cells of the algae and destroying the $\beta$-carotene, in the form of a light impermeable tablet which consists of dried powder of the algae, cyclodextrin, an antioxidant such as vitamin C and vitamin E, a lubricant such as talc and ester of sucrose and fatty acid, a binder such as reducing maltose and starches and a coloring agent such as annato-, caramel-, paprika- or oleoresin-containing sugar solution.

4 Claims, No Drawings

SOLID FOOD STUFF COMPOSITION CONTAINING DUNALIELLA ALGAE AND PROCESS FOR THE PRODUCTION THEREOF

BACKGROUND OF THE INVENTION

The present invention relates to health foodstuff containing Dunaliella algae and a process for the production thereof. More particularly, the present invention relates to solid foodstuff comprising various kinds of active components which are present in Dunaliella algae, especially β-carotene and a process for producing the same without destroying said active components.

It has been well known that Chlorella algae, which belong to the species of unicellular Chlorophyceae, are used for the purposes of preparing daily food or health food in the form of a tablet. It has also been known that Dunaliella algae produce a lot of β-carotene therein when the algae are grown in a culture fluid containing a high concentration of saline and a small amount of nitrogen under strong natural light and other appropriate conditions. It is public knowledge in the art that natural β-carotene derived from Dunaliella algae is utilized in the form of a suspension in vegetable oil as natural coloring agents for food, cosmetics, feed and the like or as material regulating vital functions such as a nourishing diet supplement. However, no practical proposal had been made concerning the method of fully utilizing Dunaliella algae per se for health-oriented food without destroying the β-carotene contained therein.

Dunaliella algae contain proteins, lipids, mineral substances such as iron, sugars, vitamins and a variety of other physiologically active ingredients. Among these nutrients, β-carotene, one of the provitamin A group of compounds, is liable to oxygen because it contains conjugated double bond chains. This presents a serious problem in the manufacture of health food containing Dunaliella algae. It has therefore been strongly desired to develop a method by which the algae can be processed without destroying natural β-carotene, and the product preserved in a stable state.

The present inventor actively investigated possible solutions for the aforementioned problems. As a result of such investigation, he has completed the present invention.

SUMMARY OF THE INVENTION

An object of the present invention is to provide solid foodstuff composition in the form of a sugarcoated tablet which comprises dried powder of Dunaliella algae and suitable additives and the weight ratio of said powder to said composition is from 10 to about 240:300.

Another object of the present invention is to provide a process for producing solid foodstuff composition containing Dunaliella algae which comprises the following steps:
adding cyclodextrin to dried powder of Dunaliella algae to form a mixture; further adding to 100 parts by weight of the mixture 3.50~4.50 parts by weight of a lubricant, 0.10~0.25 parts by weight of an antioxidant and 35.50~40.60 parts by weight of a binder and blending these components; granulating the binder-containing mixture; compressing the granules to form uncoated tablets each of which weights 300 mg and includes from 10 to about 240 mg of said powder; and covering each tablet with an opaque coating; for example a sugar coating, including a coloring agent.

DETAILED DESCRIPTION OF THE PREFERRED EMBODIMENTS OF THE INVENTION

The dried powder of Dunaliella algae used as a starting material in the present invention means such powder as is obtained by the process comprising the steps of:
(1) preliminarily removing about 50% by weight of water gradually from the culture fluid of Dunaliella algae by a dehydrator such as a centrifuge so as to make it easier to dry the fluid; (2) adding to the dehydrated culture fluid an effective amount each of an anti-caking agent, preferably dextrin, an antioxidant, preferably vitamin E, and other suitable additives and (3) spray-drying, vacuum-drying or freeze-drying the mixture thus prepared.

Dunaliella algae are morphologically characterized by the absence of a hard cell wall composed of polysaccharides, although the algae have a thin cell membrane. Other green algae, such as Chlorella algae, have both a cell wall and a cell membrane. It is also characteristic of Dunaliella algae that they contain a large amount of β-carotene. Typical examples of Dunaliella employed in the present invention include Dunaliella bardawil and Dunaliella salina.

In accordance with the present invention, from 10 to about 240 parts by weight of dried powder of Dunaliella algae is included in an uncoated tablet which weighs 300 parts by weight. In order to obtain a mixture of the dried powder and cyclodextrin, the latter is used in an amount ranging from 15 to 50 parts by weight per 100 parts by weight of the former. The ratio each of other additive materials per 100 parts by weight of the mixture thus prepared is as follows:
a lubricant from about 3.50 to 4.50 parts by weight
an antioxidant from about 0.10 to 0.25 parts by weight
a binder from about 35.50 to 40.0 parts by weight When an uncoated tablet weights about 300 parts by weight (for example, 300 mg), the maximum content of dried powder of Dunaliella algae is 80% of the total weight per tablet. From the viewpoint of health, it would be desirable to consume two or three tablets a day. The product is particularly useful if it contains a large amount of β-carotene.

Vitamins C and E are illustrative of suitable antioxidants which can be used in the present invention.

Examples of suitable binders are chitosan, starches and sugars, preferably reducing maltose. Examples of lubricants employed in the present invention are talc and ester of sucrose and fatty acid; the latter is more advantageous than the former. Examples of cyclodextrins (wherein cyclodextrin is hereinafter referred to as "CD".) include α-CD, β-CD, γ-CD, δ-CD, ε-CD, polymer-CD and CD sugar.

EXAMPLE

To culture fluid of Dunaliella algae was added a proper quantity of each of CD as anti-caking agent and vitamin E as antioxidant. The mixture obtained was spray-dried to prepare a dried powder of Dunaliella algae. To 100 mg of the dried powder was added 25 mg of CD and both were blended by a Model-V mixer at 28 rpm for ten minutes to form a mixture of both. To 100 mg of the mixture, namely, 80 mg of dried powder and 20 mg of CD, were added 0.2 mg of vitamin E, 37 mg of powdered thick malt syrup of reducing maltose and 3.9 mg of ester of sucrose and fatty acid. The mixture was blended and kneaded at 28 rpm for five minutes, and granulated in the form of fine particles by a roller converter. Granulated particles thus prepared were compressed to obtain uncoated tablets. The resulting uncoated tables were coated with a coloring agent, which is any light impermeable material, such as sugar solution to which annatto, caramel, paprika or oleoresin has been added. Thus Food containing Dunaliella algae was obtained in the form of sugarcoated tablets.

The present invention has made it practicable to obtain novel solid health foods containing active ingredients of Dunaliella algae without destroying the β-carotene in the dried powder of the algae or gradually diminishing the β-carotene content. In other words, the present invention has produced the remarkably good results of utilizing naturally occurring β-carotene with keeping its activity, and such results could not be attained by prior art.

What is claimed is:

1. A solid food sugar-coated tablet comprising a composition of dried powder of Dunaliella algae, cyclodextrin, an antioxidant, a lubricant, a binder, said composition having a coating thereon, said coating comprising sugar and a coloring agent;

said lubricant and said binder being blended at a ratio of 0.10 to 0.25 parts by weight of antioxidant, 3.50 to 4.50 parts by weight of said lubricant, and 35.50 to 40.60 parts by weight of said binder per 100 parts by weight of a mixture of said dried powder and said cyclodextrin; the weight ratio of said dried powder to said composition being from 10 to 240:300.

2. The solid food tablet according to claim 1 wherein said tablet comprises 80 mg of dried powder of Dunaliella algae; 20 mg of cyclodextrin; 0.2 mg of an antioxidant selected from the group consisting of vitamin C and vitamin E; 37 mg of powdered thick malt syrup of reducing maltose; 3.9 mg of an ester of sucrose and a fatty acid; and an effective amount of a coloring agent comprising a sugar solution with a coloring agent selected from the group consisting of annatto, caramel, paprika, and oleoresin.

3. A process for the production of a solid food tablet containing Dunaliella algae comprising:

adding from 15 to 50 parts by weight of cyclodextrin to 100 parts by weight of dried powder of Dunaliella algae;

blending said dried powder with said cyclodextrin to form a mixture;

adding to 100 parts by weight of said mixture from 0.10 to 0.25 parts by weight of an antioxidant selected from the group consisting of vitamin C and vitamin E; from 3.50 to 4.50 parts by weight of a lubricant selected from the group consisting of talc and esters of sucrose with a fatty acid; and from 35.50 to 40.60 parts by weight of a binder selected from the group consisting of chitosan, starches, and sugars;

kneading all of said ingredients together;

granulating said kneaded ingredients to form granules;

compressing said granules to form uncoated tablets; and coating said tablets with a sugar coating comprising sugar and a coloring agent selected from the group consisting of annatto, caramel, paprika, and oleoresin;

whereby the weight ratio of said dried powder to said total tablet is from 10–240:300.

4. The process according to claim 3 wherein 0.2 mg of antioxidant, 37 mg of powdered thick malt syrup of reducing maltose, and 3.9 mg of ester of sucrose with a fatty acid are added to 100 mg of the mixture consisting of 80 mg of said dried powder and 20 mg of cyclodextrin.

* * * * *